United States Patent [19]

Hums

[11] Patent Number: 4,847,234

[45] Date of Patent: Jul. 11, 1989

[54] PLATE-LIKE CATALYST

[75] Inventor: Erich Hums, Erlangen, Fed. Rep. of Germany

[73] Assignee: Siemens Aktiengesellschaft, Berlin and Munich, Fed. Rep. of Germany

[21] Appl. No.: 259,497

[22] Filed: Oct. 17, 1988

Related U.S. Application Data

[63] Continuation of Ser. No. 30,707, Mar. 25, 1987, abandoned.

[30] Foreign Application Priority Data

Mar. 26, 1986 [DE] Fed. Rep. of Germany ....... 3610338
Jul. 28, 1986 [DE] Fed. Rep. of Germany ....... 3625474

[51] Int. Cl.[4] .......................... B01J 21/06; B01J 35/02
[52] U.S. Cl. ................................. 502/208; 502/309; 502/338; 502/340; 502/350; 502/439; 502/527
[58] Field of Search .............. 502/208, 309, 338, 340, 502/350, 439, 527

[56] References Cited

U.S. PATENT DOCUMENTS 4,285,838 8/1981 Ishida et al. ............... 502/527 X
4,370,262 1/1983 Takahashi et al. ............ 252/464
4,446,250 5/1984 Niwa ............................ 502/527 X

FOREIGN PATENT DOCUMENTS 832031 4/1960 United Kingdom .
2026336 2/1980 United Kingdom .

*Primary Examiner*—W. J. Shine
*Attorney, Agent, or Firm*—Herbert L. Lerner; Laurence A. Greenberg

[57] ABSTRACT

A plate-like catalyst for reducing nitrogen oxides in flue gases in the presence of a reducing agent includes a support, an undercoating in the form of a ceramic composition disposed on the support, and a catalyst composition containing titanium oxide disposed on the undercoating.

28 Claims, 1 Drawing Sheet

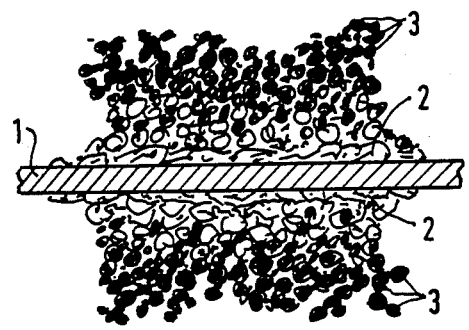

PLATE-LIKE CATALYST

This application is a continuation of application Ser. No. 030,707, filed Mar. 25, 1987, now abandoned.

The invention relates to a plate-like catalyst for reducing the nitrogen oxides in flue gases in the presence of a reducing agent, including a support, a so-called undercoating applied to the support, and a catalyst composition containing titanium oxide applied to the undercoating.

In plate catalysts, which of necessity require a suitable support material that is coated with a catalyst composition, the adhesion of the catalyst composition to the support material is a substantial problem. Stringent demands are placed on the bonding. In addition to adequate mechanical resistance to vibration of the plates in the flue gas duct, chemical stability as well as high long-term thermal resistance to temperature fluctuations of several hundred degrees must be assured.

German Pat. No. DE-PS 28 53 023, corresponding to U.S. Pat. No. 4,285,838, describes a plate-like catalyst for the reduction of $NO_x$ in the flue gas, in which a perforated metal sheet is used as the support material. In this prior art catalyst, the bonding of the catalyst material to the plate-like support is attained by means of an undercoating of metal, which is sprayed onto the support in a molten state. The catalyst composition is said to be applied to the pretreated support by immersion. In order to improve the bonding properties, a filamentary organic material is said to be added to the catalyst composition. The support coated in this manner is then said to be calcined between 300 degrees and 500 degrees C, along with the catalytic substance applied thereto.

It is accordingly an object of the invention to provide a plate-like catalyst, which overcomes the hereinafore-mentioned disadvantages of the heretofore-known devices of this general type, to further improve the bonding of the catalytic substance to the support material and to provide the longest possible service life at operating temperatures of up to 500 degrees C.

With the foregoing and other objects in view there is provided, in accordance with the invention, a plate-like catalyst for reducing nitrogen oxides in flue gases in the presence of a reducing agent, comprising a support, an undercoating in the form of a ceramic composition disposed on the support, and a catalyst composition containing titanium oxide disposed on the undercoating.

The use of a ceramic composition as an undercoating according to the invention, provides an undercoating material which is as similar in its material properties as possible, to the catalyst composition to be applied thereon. The point of departure from the prior art is the concept that the fewest possible thermal strains arise between the undercoating, the applied catalyst composition and the metal support when the coefficient of expansion of the undercoating, catalyst composition and metal support are as close to one another as possible. Additionally, the bonding between the catalyst composition and the surface of the undercoating is improved by providing sufficient surface roughness for the undercoating in the microscopic range.

In accordance with another feature of the invention, the undercoating is formed of titanium dioxide. This provides a further improvement of the bonding of the catalyst composition onto the ndercoating. In this case the same basic material being used is also a primary component of the catalyst composition. The point of departure from the prior art in this case is that the purely mechanical bonding of the titanium dioxide crystallites of the catalyst composition on the undercoating is optimized by providing that the undercoating and catalyst composition have corresponding material properties, such as sufficient surface roughness, porosity and similar coefficients of thermal expansion.

In an advantageous further development of the invention the ceramic composition of the undercoating can be chemically etched on the surface. By etching the undercoating, a portion of the ceramic composition is converted into an oxide which can be utilized for producing the catalyst. In this manner the ceramic undercoating, which adheres well to the support material, can itself be utilized for producing the catalyst composition.

In accordance with a further feature of the invention, other catalyst components are applied by impregnation in a solution or suspension of the other catalyst components after etching. This type of construction means that the catalyst composition is produced from the oxide of the undercoating and from other additionally applied components, which avoids the problem of bonding a separately applied catalyst composition on the undercoating.

When titanium oxide is advantageously used as an undercoating, during the etching process a titanium oxide surface is generated, having $TiO_2$ components which are capable of converting through titanyl sulfate into the anatase form of the titanium oxide and are excellently suited as catalytically active components.

In accordance with a concomitant feature of the invention, the other catalyst components are in the form of at least one material from the group consisting of vanadium and/or tungsten and/or molybdenum and/or magnesium and/or phosphorus and/or iron and/or chromium. This provides good adaptability of the catalyst to various flue gas compositions.

Although methods are already known for applying the active material directly onto temperature-resistant underlayers or substrates by flame spraying or plasma spraying, in the case of the catalyst combination of titanium dioxide and vanadium, these methods cannot be used directly, because the temperatures generated in the flame or plasma spraying far exceed the temperatures of evaporation of these elements. These methods would accordingly lead to a diminishment of the vanadium component and portions of the titanium dioxide would also convert into rutile.

Other features which are considered as characteristic for the invention are set forth in the appended claims.

Although the invention is illustrated and described herein as embodied in a plate-like catalyst, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the single figure of the drawing.

BRIEF DESCRIPTION OF THE DRAWING

The drawing is a fragmentary, diagrammatic, cross-sectional view of the layered structure of the plate-like catalyst.

Referring now to the figure of the drawing in detail, there is seen a portion of a carrier, support or holder plate 1, which may be formed of expanded metal in the illustrated embodiment. An undercoating or intermediate layer 2 in the form of a ceramic composition, which in the present case is titanium dioxide, can be seen on the surface of the support plate. The undercoating has an extremely great roughness, because of the spray application. The undercoating covers all of the surfaces of the expanded metal. A catalyst composition 3 is applied over the undercoating 2.

The sprayed-on undercoating or composition may have a granulation or a wide granulation of from 5 to 160 $\mu$m, containing disproportionately finer and coarser granulation. The undercoating or cermaic composition 2 may also be in the form of crushed rutile or aluminum oxide.

The support 1 may be formed of rust-proof steel and may be a perforated material in the form of expanded metal, screening or braiding.

Plates of a carrier or support material, which in the illustrated embodiment is a special steel, expanded metal or ribbed mesh, are used during the production of the plate-like catalyst according to the invention. Special steel has a coefficient of expansion similar to that of the ceramic composition to be applied as an undercoating. The expanded metal mesh is first roughened mechanically. This is done by sand blasting with silicon carbide or preferably with corundum. Particle sizes of 88 $\mu$m to 220 $\mu$m are recommended. The goal should be that the roughness brought about by the blasting is adapted to the granulation of the catalyst composition to be applied later.

The undercoating of a ceramic composition, which in the present case is titanium dioxide, is applied to the thus pretreated plates of expanded metal by flame spraying, or even better by plasma spraying. A reduced gas atmosphere is recommended, such as an argon-hydrogen atmosphere in the case of gas-stabilized plasma. Alcohol or water is used with liquid-stabilized plasma.

When agglommerated titanium oxide is used, spray material with a granulation of 45 to 125 $\mu$m is preferably used. The result is rough and porous titanium dioxide surfaces on the expanded metal. These surfaces improve the bonding of the catalyst composition applied thereto, especially because of their roughness and porosity. The catalyst composition can be roller plated onto the pretreated flame or plasma sprayed support, or a coat of it can be applied to the support by immersion. In the ensuing sintering process, the material forming the catalyst composition, that is, the titanium dioxide, combines with the material of the titanium dioxide undercoating.

It has been found that catalysts produced in this way and intended for reducing nitrogen oxides in flue or waste gases, are suited for use in the presence of either ammonia or carbon monoxide as reducing agents.

It has proven to be particularly suitable to use a ceramic composition of agglommerated titanium dioxide for the undercoating.

According to another processing embodiment, the flame or plasma-sprayed surface can be etched with acid or lye, depending on the product sprayed. In the case of $TiO_2$ surfaces, sulfuric acid is suitable. It is also conceivable to use some other acid, such as acetic acid, for this purpose. The titanium oxide is finally partly converted into the anatase modification by means of the etching process. The acid residue can then be removed by washing. It would also be possible to dispense with the method step of the washing.

The thus broken-down titanium dioxide surface can then be coated quite advantageously with the further catalyst component. This can be done by immersion in a solution or suspension containing the further catalyst components or by vapor deposition of the further catalyst components. Besides vanadium, examples of suitable catalyst components of this kind are additives such as tungsten, molybdenum, magnesium, phosphorus, iron, and chromium. The catalyst which has been taken out of the solution and drained, is predried and then calcined in a furnace. An ensuing calcination of the assembled catalyst is required for the vapor deposition of the further catalyst oomponents as well. The other catalyst components may be applied by dusting.

I claim:

1. Plate-shaped catalyst for reducing nitrogen oxides in flue gases in the presence of a reducing agent, comprising a support, an undercoating in the form of a ceramic composition of titanium oxide sprayed on said support, and a catalyst composition containing titanium oxide disposed on said undercoating.

2. Plate-shaped catalyst for reducing nitrogen oxides in flue gases in the presence of a reducing agent, comprising a support, an undercoating in the form of a ceramic composition of titanium dioxide sprayed on said support, and a catalyst composition containing titanium oxide disposed on said undercoating.

3. Plate-shaped catalyst according to claim 1, wherein said ceramic composition is a liquid flamed-sprayed on said support.

4. Plate-shaped catalyst according to claim 1, wherein said ceramic composition is a plasma sprayed on said support.

5. Plate-shaped catalyst according to claim 1, wherein said ceramic composition is a plasma sprayed on said support in a reducing atmosphere.

6. Plate-shaped catalyst according to claim 3, wherein said sprayed-on ceramic composition has granules of substantially equal size in a range of from 5 to 160 $\mu$ m.

7. Plate-shaped catalyst according to claim 4, wherein said sprayed-on ceramic composition has granules of substantially equal size in a range of from 5 to 160 $\mu$m.

8. Plate-shaped catalyst according to claim 3, wherein said sprayed-on ceramic composition has granules differing in size in a wide granulation range of from 5 to 160 $\mu$m.

9. Plate-shaped catalyst according to claim 4, wherein said sprayed-on ceramic composition has granules differing in size in a wide granulation range of from 5 to 160 $\mu$m.

10. Plate-shaped catalyst according to claim 3, wherein said sprayed-on ceramic composition has a granulation of from 5 to 160 $\mu$m containing disproportionately finer and coarser granulation.

11. Plate-shaped catalyst according to claim 4, wherein said sprayed-on ceramic composition has a granulation of from 5 to 160 $\mu$m containing disproportionately finer and coarser granulation.

12. Plate-shaped catalyst according to claim 3, wherein said support is mechanically roughened prior to application of said undercoating.

13. Plate-shaped catalyst according to claim 12, wherein said roughening is carried out by sand blasting and corumdum blasting.

14. Plate-shaped catalyst according to claim 1, wherein said support is formed of rust-proof steel.

15. Plate-shaped catalyst according to claim 1, wherein said support is formed of perforated material from the group consisting of expanded metal, screening and braiding.

16. Plate-shaped catalyst according to claim 1, wherein said ceramic composition is in the form of agglommerated titanium dioxide.

17. Plate-shaped catalyst according to claim 1, wherein said ceramic composition is in the form of sintered titanium dioxide.

18. Plate-shaped catalyst according to claim 1, wherein said ceramic composition is in the form of crushed rutile.

19. Plate-shaped catalyst according to claim 1, wherein said ceramic composition is a liquid-stabilized plasma sprayed on said support.

20. Plate-shaped catalyst according to claim 1, wherein said ceramic composition has a chemically etched surface forming a component for a catalyst composition.

21. Plate-shaped catalyst according to claim 20, wherein other catalyst components are applied by impregnation in a solution or suspension of the other catalyst components after etching.

22. Plate-shaped catalyst according to claim 21, wherein said other catalyst components are in the form of at least one material from the group consisting of vanadium, tungsten, molybdenum, magnesium, phosphorus, iron and chromium.

23. Plate-shaped catalyst according to claim 2, wherein said other catalyst components are applied by thermal methods following the etching process.

24. Plate-shaped catalyst according to claim 22, wherein said other catalyst components are applied by dusting.

25. Plate-shaped catalyst according to claim 20, wherein sulfuric acid is used for etching said ceramic composition.

26. Plate-shaped catalyst according to claim 20, wherein acetic acid is used for etching said ceramic composition.

27. Plate-shaped catalyst according to claim 20, wherein caustic soda is used for etching said ceramic composition.

28. Plate-shaped catalyst according to claim 21, wherein said catalyst composition is calcined.

* * * * *